UNITED STATES PATENT OFFICE.

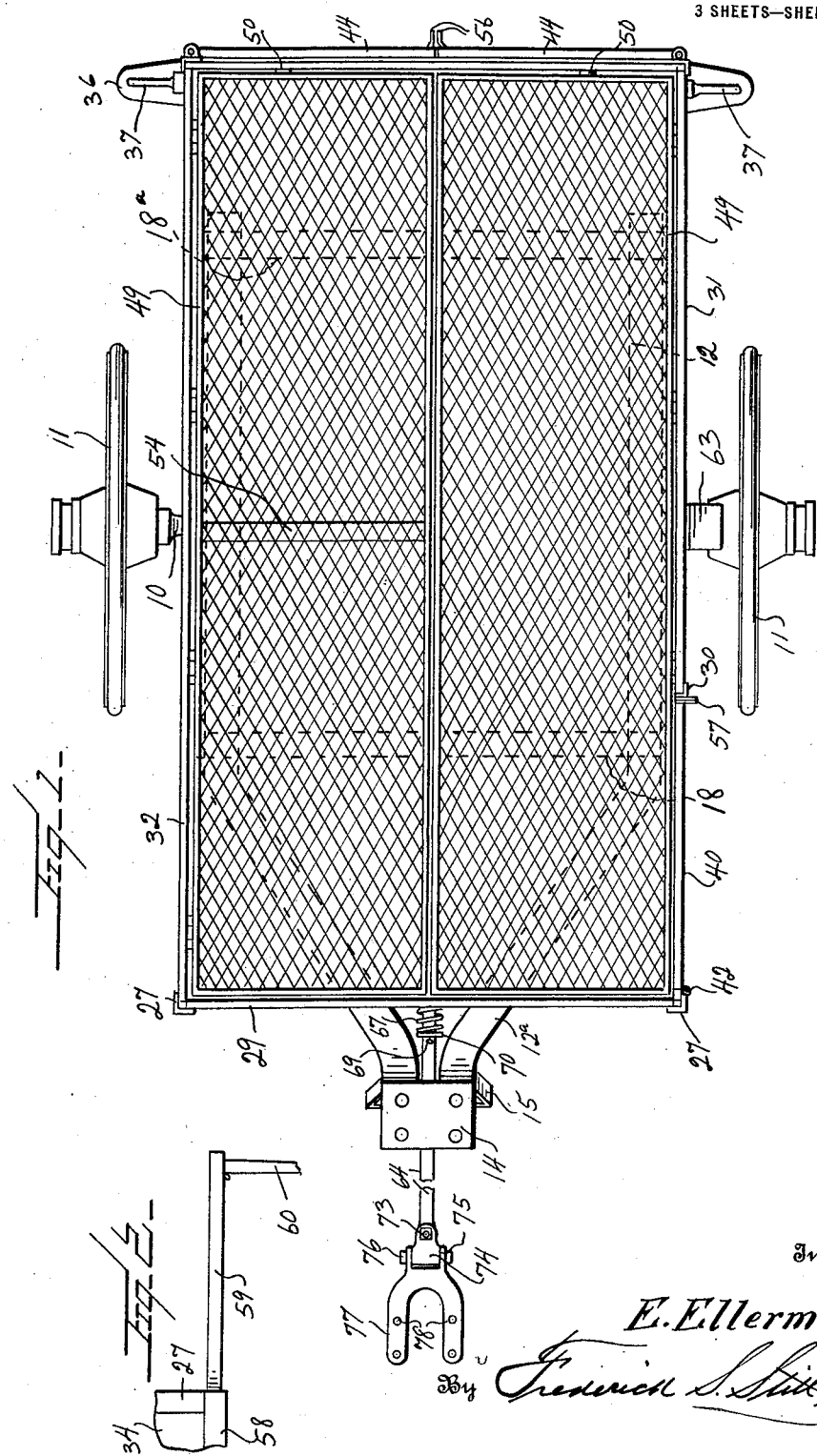

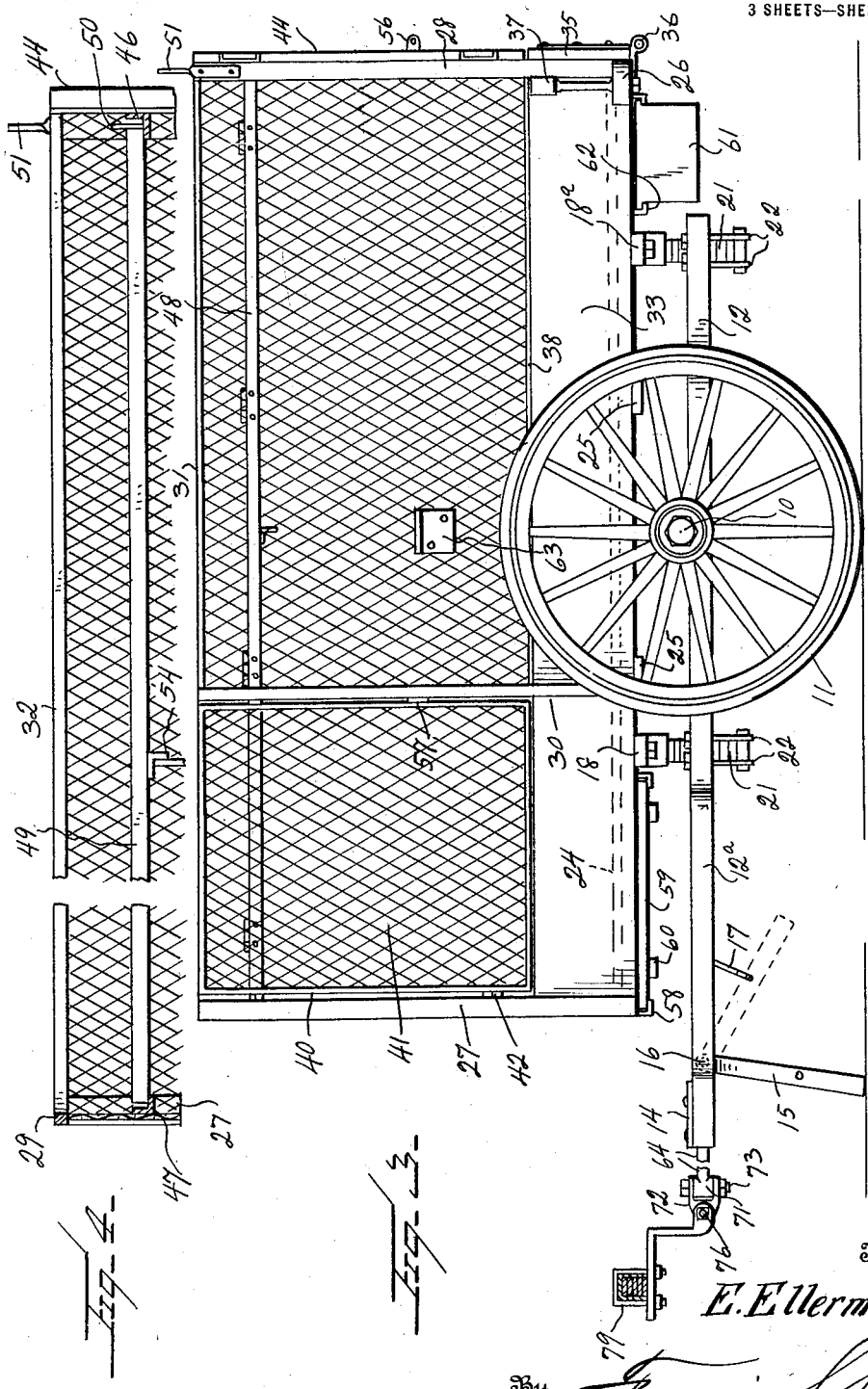

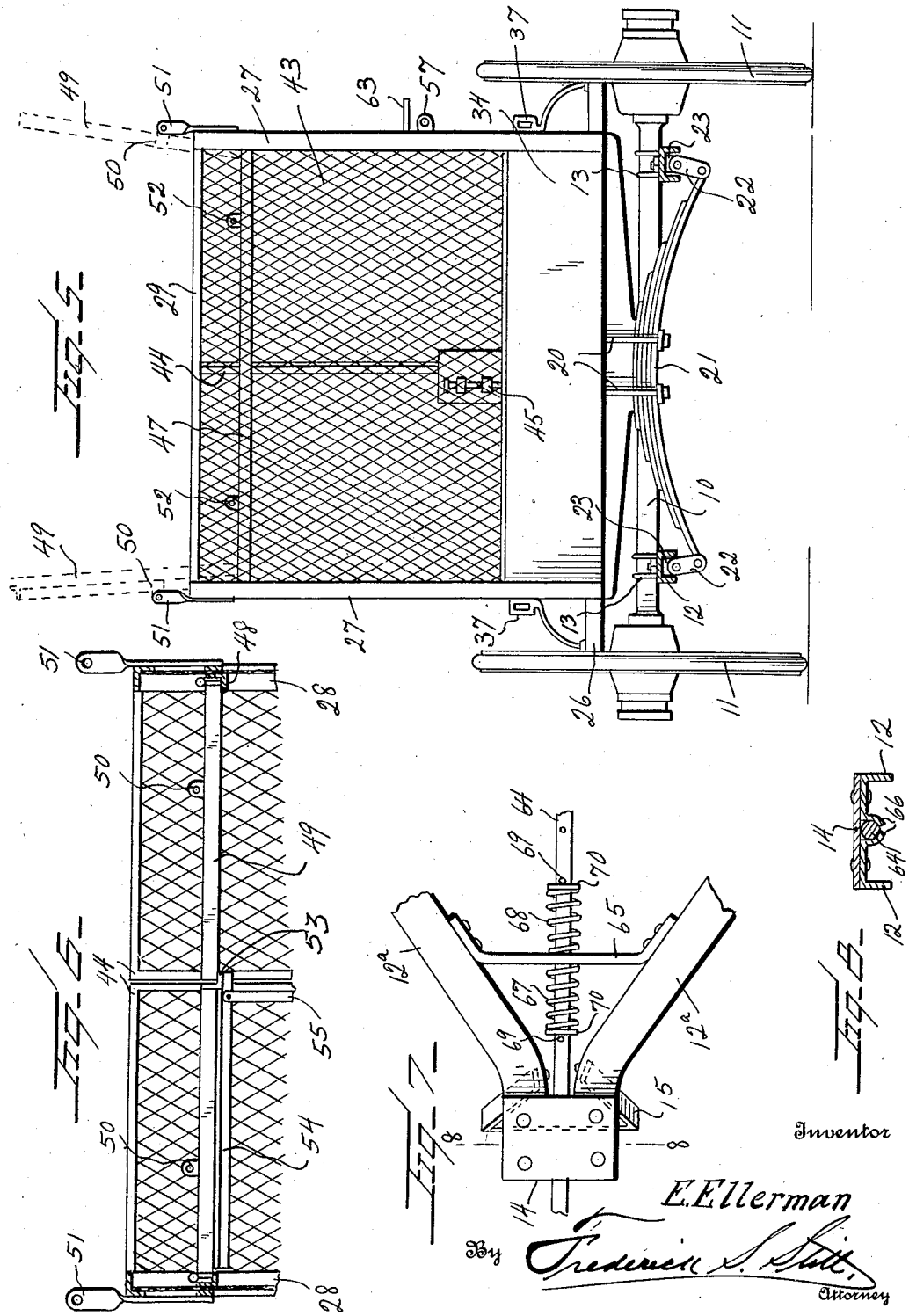

EDWARD ELLERMAN, OF LITTLETON, COLORADO, ASSIGNOR OF FIFTY-ONE ONE-HUNDREDTHS TO J. ERNEST MITCHELL, OF LITTLETON, COLORADO.

AUTOMOBILE-TRAILER.

1,385,437.   Specification of Letters Patent.   Patented July 26, 1921.

Application filed July 21, 1920. Serial No. 397,910.

*To all whom it may concern:*

Be it known that I, EDWARD ELLERMAN, a citizen of the United States, residing at Littleton, in the county of Arapahoe and State of Colorado, have invented certain new and useful Improvements in Automobile-Trailers, of which the following is a specification.

This invention relates to vehicles in the nature of trailers, and particularly to trailers to be used with automobiles as tractors.

The general object of this invention is the provision of a trailer which is convertible so that it may be used for transporting live stock or goods or whereby it may be used by campers or travelers.

One of the particular objects in this connection is to provide a trailer having a body including side walls and end walls, with sections forming the top of the body hinged to the side walls or end walls thereof and designed so that they may be turned to a vertical position to thereby form extensions of the side or end walls, or into a horizontal position to close the body, and in this latter position may be used as the support for a bed, those portions of the side or end walls projecting above these closed lid sections acting as the sides and ends of the bed respectively.

A further object is to provide a construction of this character wherein one side of the body is provided with a door adjacent the forward end of the body through which stock may be inserted or articles placed within the body without the necessity of opening the rear doors.

A further object is to provide an improved supporting frame for a trailer so connected to the body that the weight will be distributed equally over the supporting frame, the supporting frame being adapted to be used with either two wheels or four wheels, as may be desired.

Another object is to provide an improved draw bar construction whereby the trailer may be connected to the chassis of a tractor automobile, the draw bar construction being such as to provide for a flexible connection between the tractor vehicle and the trailer.

Another object is to resiliently or yieldably support the draw bar upon the supporting frame of the trailer so as to yieldingly cushion the draw bar against forward or rearward movement relative to the frame of the trailer.

And another object is to provide a trailer of this character with a slidable shelf or table mounted in the bottom of the body and slidable into or out of projected positions and having means whereby it may be supported when outwardly moved.

Another object is to provide means for supporting the tongue or draw bar of the trailer when the trailer is uncoupled from the tractive automobile.

A further and general object is to provide a construction of this character wherein the body of the trailer is in the form of a cage of light but durable material, provided with doors which can be locked to thereby secure the stock or goods within the trailer against theft or loss.

Another object is to so construct the frame that bows may be disposed to extend over the top of the frame to support a canvas covering.

Other objects will appear in the course of the following description.

My invention is illustrated in the accompanying drawings, wherein:—

Figure 1 is a top plan view of a trailer constructed in accordance with my invention;

Fig. 2 is a fragmentary elevation of a portion of the body showing the sliding shelf 59 pulled out;

Fig. 3 is a side elevation of the trailer shown in Fig. 1;

Fig. 4 is a fragmentary longitudinal vertical sectional view through the upper portion of the body of the trailer and showing the lids lowered;

Fig. 5 is a front elevation of the body of the trailer showing the lids raised in dotted lines and lowered in full lines;

Fig. 6 is a transverse vertical sectional view looking toward the rear of the vehicle and showing the rear doors;

Fig. 7 is a fragmentary top plan view of the forward end of the supporting frame and of the draw bar;

Fig. 8 is a section on the line 8—8 of Fig. 7.

In these drawings, I have illustrated my trailer construction as being supported upon one pair of wheels and have provided for this purpose the transversely extending axle 10, upon which the supporting wheels 11 are mounted, these wheels being disposed about the middle of the trailer. Attached to the axle by the clips 13 are the longitudinally extending frame beams 12, which are shown as of channel iron, though angle iron may be used wherever desired. These beams 12 extend rearward beyond the axle to a point about one-quarter of the length of the body from the rear end thereof and forward to a point about one-quarter of the length of the body from the forward end thereof, and from this point are convergently inclined, as at 12ª, and then longitudinally extended, these longitudinal extensions of these beams being held in abutting relation by means of a gusset plate 14 riveted, bolted or otherwise attached to the webs of the beams. Pivoted to the inside flanges of the beams adjacent the point where these beams come together is a supporting foot, designated generally 15, formed of a strip of metal bent to provide a bottom portion and two upwardly and inwardly inclined side portions, these legs or side portions being pivoted at their upper ends, as at 16, to the inside flanges of the channel irons. This supporting member 15 may be lowered to a vertical position or turned upward to the position shown in dotted lines in Fig. 3 and held in its raised position by means of a hook 17 or other suitable member of this character.

The body of the vehicle is supported between the axle and the forward wheels upon a transverse bolster 18, the middle of this bolster being connected by U-bolts 20 to a bowed spring 21 whose ends extend downward and outward, the extremities of this spring being operatively connected by links 22 and pivot bolts to bracket 23 bolted to the longitudinal channel irons 12 in the manner illustrated in Fig. 5. The same construction is used for the rear bolster 18ª, which is "underslung" by the springs 21 and links 22, as heretofore described.

Supported upon the bolsters 18 and 18ª is the body of the vehicle, which comprises a floor 24 of any suitable material and is braced at a plurality of points by transverse braces 25 and at its rear end by a transverse brace 26 which extends out beyond the body. Attached to this floor and extending upward therefrom on each side at the front are the vertical channel or angle iron members 27 and at the rear are the vertical channel iron members 28. These bars or members 27 and 28 are connected by channel iron or angle iron cross pieces 29. On one side there is an intermediate vertical channel or angle iron member 30 which is placed adjacent to but rearward of the forward bolster, this vertical member 30 being connected to the vertical member 28 on the same side by a longitudinally extending channel iron frame member 31. On the opposite side, a longitudinally extending frame member 32 extends from the forward end to the rear end of the vehicle and connects the members 27 and 28 on that side. Extending upward on both sides of the vehicle are the side boards 33 which are preferably about 8" in width and have a length equal to the length of the vehicle, and at the forward end there is the end board 34 and at the rear end the end board 35. This last board is preferably hinged, as at 36, to the floor and forms an end gate. The forward end board also may be hinged, if desired. The usual braces 37 are preferably attached to the projecting ends of the transverse brace 26 and to the rear ends of the side boards 33. Attached to the tops of these side boards 33 are the metallic strips 38, and extending between these strips and the frame members 31 is wire netting of relatively coarse and heavy interwoven wires or grille work.

Between the member 30 and the member 27 and above the side board there is provided a rectangular door frame of angle iron or like material, designated 40, which carries a screen of heavy coarse wire mesh 41, this door being hinged to the member 27, as at 42. The forward end of the trailer is also closed by a front screen of heavy coarse wire mesh, designated 43, while the rear end of the trailer is preferably closed by two doors 44 formed each of a rectangular frame of metal and heavy coarse wire screen material, this door being hinged to the rear members 28. Preferably two doors are used, these doors having a height equal to the height of the members 27 and 28 above the side boards 33. A bolt or other locking device 45 may be used for holding these doors closed, this bolt being disposed upon the inside face of one door so that when the bolt is shot, this door will be held closed so that the other door may be locked to the bolted door. Below the upper ends of the members 28 there is a transverse bar 46, and at the forward end of the vehicle and attached to the forward supporting members 27 and below the upper ends thereof there is a transverse bar 47. These bars may be of angle or channel iron. Extending on each side from the forward vertical members 27 to the rear vertical members 28 is the angle iron or channel iron supporting bar 48, and hinged to these bars at a plurality of points are the lids 49 designed to extend over the body and rest on the supporting bars 46 and 46ª when the lids are turned into a horizontal position.

It will be seen that when these sections 49 are turned into a horizontal position, they are below the upper edges of the side and end walls of the body so that these lids may be used as supports for a bed. When these lids are raised to the position shown in dotted lines in Fig. 5, they form extensions of the side walls of the body. The lids are adapted to be held in their raised position by being provided with perforated lugs 50 fastened on the framework of the lids and registering with perforated lugs 51 mounted upon the side frames at one or both ends of the side frames, a locking bolt, pin or padlock being adapted to pass through the perforations of these coacting lugs. Similar lugs 52 are attached to the forward or rear cross bars or angle irons 46 and 47, with which said lugs 50 are adapted to register, so that the lids may be locked in a closed position by a padlock or other like device. Preferably one of the lid sections 49 is provided with an angle iron 53 at its free edge, and the other lid section 49 is adapted to overlap and rest upon this horizontal flange 53 when the lid sections are closed. That lid section which is provided with the angle iron 53 has intermediate its length the transverse supporting brace 54, and swingingly engaged with the end of this supporting brace is a leg 55 which, when the lid is swung into a horizontal position, swings downward and rests upon the floor. Thus, it will be seen that these two lids are supported upon the members 46 and 47 when they are swung downward, and the middle of these lids is supported by means of the leg 55.

The rear doors 43 are composed of rectangular frames of channel or angle iron supporting a relatively heavy screen material or reticulated wire, and these rear doors are hinged to the rear supporting members 28 so as to swing to a closed position or outward, and they are held closed by lugs 56 pierced for the passage of a padlock. Of course, the side door 41 is also formed with an outwardly projecting, pierced lug 57 adapted to coact with a like lug on the supporting member 30 whereby the door may be locked in a closed position.

Attached to the bottom of the vehicle and extending transversely thereof are the metallic angular guides 58, and disposed in these guides is a shelf or table 59 which is slidable in the guides and is provided with suitable stops for preventing its moving outward beyond a certain distance, and is provided at its extremities with pivoted legs 60 adapted to be folded up beneath the table and held in this folded up position in any desired manner, as by buttons or latches. These legs are swung down when the table top is slid out to its operative position. The rear end of the vehicle may also be provided with a drawer or tool box 61, if desired, mounted in guiding angle irons 62, and one side wall of the structure may be provided with an outwardly projecting bracket 63 forming a step disposed more or less in alinement with the hub of the adjacent wheel so that a person may, by this means, climb over the top of the vehicle if the upper bed is made and it is desired to use it.

It is most desirable in trailers that the draw bar of the trailer shall be flexibly connected to the tractive vehicle so that the oscillations, jars and smaller movements of the tractor vehicle will not be transmitted to the trailer and vice versa, and it is further necessary that the strain exerted on the trailer by the draw bar should be cushioned, both as regards pulling and backing. To this end I have provided the draw bar 64, which is shown as in the form of a longitudinally extending rod extending beneath the gusset plate 14 and extending rearward through a transverse brace 65 riveted to the angular portions 12ª of the beams 12. The draw bar is guided in its longitudinal movements by curving downward and inward the adjacent flanges 66 of the portions 12ª of the channel irons, as seen in Fig. 8, so that the draw bar or rod 64 is accommodated between these downwardly and inwardly curved lids or flanges and the gusset plate 14 and slides longitudinally therethrough and through the brace 65. Springs 67 and 68 are located on opposite sides of the brace 65 and surround the rod 64. These are coiled compression springs and the draw bar is formed with a plurality of perforations within which pins 69 may be placed, which engage with washers 70 disposed next to the ends of the springs. Thus, it will be obvious that upon a forward movement of the draw bar, the spring 68 will be compressed and yieldingly resist this forward movement, and upon a rearward movement of the draw bar, the spring 67 will be compressed and yieldingly resist the rearward movement. By adjusting the pin 69 in the apertures of the draw bar, the tension of the springs may be adjusted, that is the springs may be more or less initially compressed.

For flexibly connecting the draw bar to the tractive vehicle, I provide on the forward end of the draw bar a head 71 and provide a knuckle 72 which is bifurcated to receive this head and through which passes the vertical bolt 73. This knuckle is provided with a head 74 having a transverse aperture, that is a horizontal aperture, and embraced by two pierced ears 75 through which passes a bolt 76. These ears 75 form part of an angular bracket 77 which extends upward from the ears, then horizontally, the horizontal portion of the bracket being bifurcated and pierced at a plurality of points.

Mounted upon the rear end of the tractive vehicle is a member 79 which is clamped over the rear spring, as for instance the rear spring of a Ford chassis, this member being provided with bolts, pins or other like devices adapted to pass through the openings 78 in the angular bracket 77. It will thus be seen that the coupling formed by the parts 71 to 77 permits the trailer to move vertically independent of the tractive vehicle and swing laterally independently of the tractive vehicle, thus avoiding the relatively rigid connection by which a trailer is usually connected to the tractive vehicle at present and permitting the trailer to track properly with relation to the tractive vehicle and to move vertically in conformity with the contour of the road and independently of the tractive vehicle.

It will be seen from Fig. 3 that the trailer has the following advantages: It is low, making it easy to load. It is light but strong enough to withstand the hard service to which it may be put by the user. The chassis being relatively heavy, keeps the trailer on the ground. The direct pull is on the frame and not on the body of the trailer at all so that all of the strain comes on the strongest parts of both the car and the trailer. The trailer is adapted to be used for the transportation of hogs, poultry, milk, groceries, laundry, parcel post, etc., and when used by the tourist, the lids form a support for an upper berth or bed. When the trailer is used for carrying stock, these lids, when closed, will prevent the escape of the stock, and when straight up they form an uprgiht extension for the sides proper whereby cows and other large stock can be hauled in this cage or box. The forward door on the side of the trailer may be used for working the hogs or poultry toward the rear of the trailer or for making up a bed in the lower berth. The top frame bars of the trailer or the sides may be provided with suitable sockets for the reception of bows to support a canvas covering.

While I have illustrated a construction which I have found in actual practice to be particularly adapted for the purpose intended, yet I do not wish to be limited to the details of this construction, as it is obvious that these might be varied in many ways without departing from the spirit of the invention.

I claim:—

1. A trailer of the character described comprising a wheel supported frame having a draft connection, a body yieldingly supported upon said frame and having side and end walls of wire screen material, and sections constituting lids hinged to the side walls of the body adjacent the upper edges of the side walls and movable into a horizontal position or into an upright position, the frame of the body being provided with means whereby said lid may be supported in a horizontal position to thereby constitute a support for an upper berth.

2. A trailer of the character described comprising a wheel supported frame, a body disposed above the frame, springs supporting the body on the frame, said body comprising a floor, vertically disposed frame members disposed at the corners of the body, longitudinally extending frame members, open mesh material attached to said frame members and constituting the side walls of the body, rear doors hinged to the rear vertical members and each formed of a metallic frame and a wire mesh screen, longitudinally extending irons attached to said forward and rear frame members and disposed below the upper edges of the side walls, and oppositely disposed, longitudinally extending lid sections, each formed of a metallic frame, an open work structure of wire mesh attached thereto, said lid sections when disposed in a horizontal position extending entirely across the body and closing the top of the same and when raised constituting extensions of the side walls, and means for supporting said lid sections in a horizontal position.

3. A trailer of the character described comprising a wheel supported frame, a body disposed above the frame, springs supporting the body on the frame, said body comprising a floor, vertically disposed frame members disposed at the corners of the body, longitudinally extending frame members, open mesh material attached to said frame members and constituting the side walls of the body, rear doors hinged to the rear vertical members and each formed of a metallic frame and a wire mesh screen, longitudinally extending irons attached to said forward and rear frame members and disposed below the upper edges of the side walls, oppositely disposed, longitudinally extending lid sections, each formed of a metallic frame, an open work structure of wire mesh attached thereto, said lid sections when disposed in a horizontal position extending entirely across the body and closing the top of the same and when raised constituting extensions of the side walls, and means for supporting said lid sections in a horizontal position, said means comprising an angle iron attached to the free edge of one of said lid sections and upon which the free edge of the other lid section rests when the lids are closed, and a leg hingedly connected to that lid section having the angle iron and adapted to rest upon the floor when the lid section is lowered to a horizontal position.

4. A trailer comprising a wheel supported frame and a body yieldingly mounted thereon, the body having side walls and a forward end wall, rear doors hinged to the side walls, lid sections operatively hinged to the side walls below the upper edges thereof and adapted to be turned to a horizontal position or raised to a vertical position to form extensions of the side walls, means for supporting the lid sections in a lowered position, and means for locking the lid sections in their lowered or raised positions.

5. A trailer comprising a wheel supported frame and a body yieldingly mounted thereon, the body having side walls and a forward end wall, rear doors hinged to the side walls, lid sections operatively hinged to the side walls below the upper edges thereof and adapted to be turned to a horizontal position or raised to a vertical position to form extensions of the side walls, means for supporting the lid sections in a lowered position, and means for locking the lid sections in their lowered or raised positions, said last named means comprising coacting members mounted upon the lid sections and upon said rear doors.

6. A trailer comprising a wheel supported frame and a body yieldingly mounted thereon, the body having side walls and a forward end wall, rear doors hinged to the side walls, lid sections operatively hinged to the side walls below the upper edges thereof and adapted to be turned to a horizontal position or raised to a vertical position to form extensions of the side walls, means for supporting the lid sections in a lowered position, and means for locking the lid sections in their lowered or raised positions, one of the side walls being provided at its forward end with a door.

7. A trailer comprising a wheel supported frame, a body yieldingly mounted upon said frame comprising a floor, imperforate side walls extending upward from the floor a relatively short distance, the side walls above this imperforate portion being formed of reticulated metal, a front wall attached to the body and closing the forward end of the body, the rear end of the body being closed by a hinged tail board of imperforate material and by doors of reticulated metal hinged to the side walls of the body and disposed above the tail board, and lid sections hinged to the side walls of the body below the upper edges thereof and shiftable into a horizontal position or into a vertical position where they form extensions of the side walls, and means for holding said lid sections in their closed or open positions.

In testimony whereof I affix my signature.

EDWARD ELLERMAN.